(12) United States Patent
Narayanaswami et al.

(10) Patent No.: US 8,200,540 B2
(45) Date of Patent: Jun. 12, 2012

(54) INTERACTIVE PRODUCT MAPS

(75) Inventors: Chandrasekhar Narayanaswami, Wilton, CT (US); Danny Soroker, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 12/198,158

(22) Filed: Aug. 26, 2008

(65) Prior Publication Data

US 2010/0057581 A1  Mar. 4, 2010

(51) Int. Cl.
*G06Q 30/00* (2006.01)
(52) U.S. Cl. ...... 705/26.1; 705/27.1; 345/428; 345/628; 709/206
(58) Field of Classification Search .......... None
See application file for complete search history.

(56) References Cited

U.S. PATENT DOCUMENTS

| | | | |
|---|---|---|---|
| 4,298,693 A | 11/1981 | Wallace | |
| 4,463,019 A | 7/1984 | Okuhara et al. | |
| 4,659,299 A | 4/1987 | Pierik | |
| 4,812,324 A | 3/1989 | Pierik | |
| 4,900,565 A | 2/1990 | Spies | |
| 5,612,055 A | 3/1997 | Bedford et al. | |
| 6,117,503 A | 9/2000 | Lee et al. | |
| 7,263,500 B2 * | 8/2007 | Deal | 705/26 |
| 7,729,946 B2 * | 6/2010 | Chu | 705/26.61 |
| 2006/0173961 A1 * | 8/2006 | Turski et al. | 709/206 |
| 2007/0043617 A1 | 2/2007 | Stein et al. | |
| 2007/0150516 A1 | 6/2007 | Morgan et al. | |
| 2007/0233782 A1 | 10/2007 | Tali | |
| 2007/0250390 A1 * | 10/2007 | Lee et al. | 705/14 |
| 2007/0297755 A1 | 12/2007 | Holt et al. | |
| 2008/0010615 A1 | 1/2008 | Curtis et al. | |
| 2008/0016114 A1 | 1/2008 | Beauregard et al. | |
| 2008/0065974 A1 | 3/2008 | Campbell | |
| 2008/0066080 A1 | 3/2008 | Campbell | |
| 2008/0082539 A1 | 4/2008 | Doane et al. | |
| 2009/0234875 A1 * | 9/2009 | Mathai et al. | 707/102 |
| 2010/0201712 A1 * | 8/2010 | Grignani et al. | 345/660 |

* cited by examiner

*Primary Examiner* — Luna Champagne
(74) *Attorney, Agent, or Firm* — Jon A. Gibbons; Fleit Gibbons Gutman Bongini & Bianco PL

(57) ABSTRACT

A method, system, and computer program product present products in an interactive environment. A determination is made that a user is accessing at least a portion of a given level in a set of levels of the interactive environment using at least a zoom operation on at least a portion of the interactive environment. The zoom operation dynamically changes a product information detail level of the interactive environment to correspond to one level in the set of levels. Each subsequent level in the set of levels is associated with a set of more detailed product information than a previous level. A set of product information associated with the given level and the portion of the given level is accessed based on the portion of the given level being accessed by the user. The set of product information that has been accessed is displayed to the user in the interactive environment.

18 Claims, 13 Drawing Sheets

| 114 |
|---|

| Electronics and Computers | Appliances | Hardware | Apparel |
|---|---|---|---|
| CompUSA \| Best Buy \| Circuit City | Sears \| J&R \| All Appliances | Lowes \| Home Depot \| ACE | Macys \| Lord and Taylor \| JC Penney |

1002 → Electronics and Computers

1004 → CompUSA

FIG. 10

INTERACTIVE PRODUCT MAPS

FIELD OF THE INVENTION

The present invention generally relates to the field of product information management, and more particularly relates to providing an interactive product mapping environment with zoom/pan features.

BACKGROUND OF THE INVENTION

E-commerce has drastically increased in recent years. Users are able to purchase a wide variety of products from many different vendors. However, most on-line shopping environments require users to click through numerous pages to interact with the environment and locate products. In many instances this is time consuming and cumbersome. Additionally, many on-line shopping environments do not provide mashup capabilities that can offer a more user-friendly experience. Therefore a need exists to overcome these problems.

SUMMARY OF THE INVENTION

In one embodiment, a method for presenting products in an interactive environment is disclosed. The method includes determining that a user is accessing at least a portion of a given level in a set of levels of the interactive environment using at least a zoom operation on at least a portion of the interactive environment. The zoom operation dynamically changes a product information detail level of the interactive environment to correspond to one level in the set of levels. Each subsequent level in the set of levels is associated with a set of more detailed product information than a previous level in the set of levels. A set of product information associated with the given level and the portion of the given level is accessed based on the portion of the given level being accessed by the user. The set of product information that has been accessed is displayed to the user in the interactive environment.

In another embodiment, an information processing system for presenting products in an interactive environment is disclosed. The information processing system includes a memory and a processor that is communicatively coupled to the memory. The information processing system also includes an interactive product environment that is communicatively coupled to the memory and the processor. The interactive product environment is adapted to determine that a user is accessing at least a portion of a given level in a set of levels of the interactive environment using at least a zoom operation on at least a portion of the interactive environment. The zoom operation dynamically changes a product information detail level of the interactive environment to correspond to one level in the set of levels. Each subsequent level in the set of levels is associated with a set of more detailed product information than a previous level in the set of levels. A set of product information associated with the given level and the portion of the given level is accessed based on the portion of the given level being accessed by the user. The set of product information that has been accessed is displayed to the user in the interactive environment.

In yet another embodiment, a computer program product for presenting products in an interactive environment is disclosed. The computer program product includes instructions for determining that a user is accessing at least a portion of a given level in a set of levels of the interactive environment using at least a zoom operation on at least a portion of the interactive environment. The zoom operation dynamically changes a product information detail level of the interactive environment to correspond to one level in the set of levels. Each subsequent level in the set of levels is associated with a set of more detailed product information than a previous level in the set of levels. A set of product information associated with the given level and the portion of the given level is accessed based on the portion of the given level being accessed by the user. The set of product information that has been accessed is displayed to the user in the interactive environment.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIGS. 3-11 are schematics of an interactive environment displaying information in progressively more detail based on a current level and/or position a user has zoomed/panned into in an interactive environment according one embodiment of the present invention;

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

General Operating Environment

Figure 1:
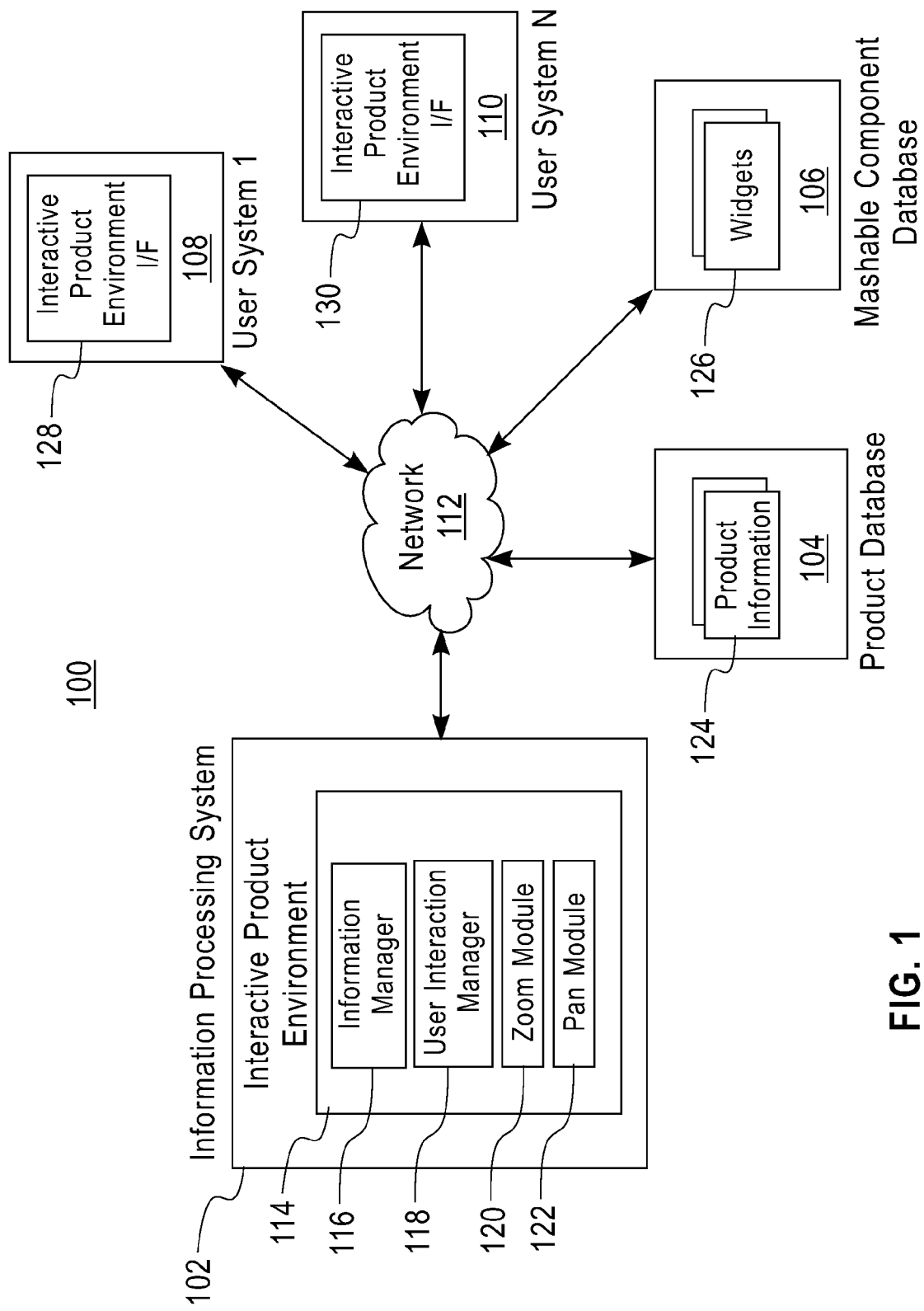
FIG. 1 is block diagram illustrating a general overview of an operating environment according to one embodiment of the present invention.

According to one embodiment of the present invention as shown in FIG. 1 a general overview of an operating environment 100 is illustrated. In particular, FIG. 1 shows an operating environment 100 for providing an interactive product map environment. The operating environment 100, in one embodiment, includes one or more information processing systems 102, product databases 104, mashable component databases 106, and user systems 108, 110. Each of these systems 102, 104, 106, 108, 110 is communicatively coupled to one another via one or more networks 112. The network(s) 112, in one embodiment, are wired and/or wireless networks.

The information processing system 102, in one embodiment, includes an interactive product environment 114. The interactive product environment 114 takes in various data feeds such as inventory, price, user ratings, discounts, and the like and correlates the data feeds to individual products and/or product categories. The mashups created by correlating the data feeds with products/product categories are then visually displayed to the user on a product map included within the interactive product environment 114 The interactive product environment 114 includes an information manager 116, a user interaction manager 118, a zoom module 120, and a pan module 122. The interactive product environment 114 in one embodiment is a website or web application that provides a zoomable and pannable interactive substrate that displays a hierarchy of products available in a store (or from a group of stores). The ability to zoom/pan within the environment also allows a using accessing the environment 114 via a portable device to more effectively browse the environment.

The interactive product environment 114 can greatly enhance a shopper's experience and efficiency in obtaining information about products. Users can search for products by several parameters and narrow down choices for comparison. Users can also contribute their feedback and ratings on products that can be plotted on the interactive substrate and then searched by ratings, tags, etc.

The interactive environment 114 can also be used by store owners to visualize data of interest such as sales figures and inventory. Suppliers can also quickly see the sales and stock quantities in different stores and adjust supply chains accordingly. The visualization can be rearranged dynamically based on the order of classification. For example, one order may use "product type" as the top-level classifier, whereas a different order may use "manufacturer" as the top-level classifier. The interactive product environment 114 is discussed in greater detail below. The interactive product environment 114 and its components 116, 118, 120, 122 are discussed in greater detail below.

The product database 104 includes product information 124 that is displayed by the information manager 116 in the environment 114 based on the current zoom level or pan position of the environment 114. When a user performs a zoom operation a given level of a product hierarchy is displayed where a one zoom level displays the most generic level (e.g., the least detailed level) of the product hierarchy whereas a subsequent zoom level displays a more detailed level of the product hierarchy. The product information 124 is discussed in greater detail below. The mashable component database 106 includes mashable components/widgets 126. The widgets 126 can be wired together or wired to other components within the environment 114 to create a mashable product map substrate presented to users in the environment 114. The widgets 126 and mashable aspect of the environment 114 are discussed in greater detail below. The user systems 108, 110 each include an interactive product environment interface 128, 130. The interface 128, 130 can be, in one embodiment, a web browser or an application presenting a GUI to the user that allows the user to interact with the environment 114.

Interactive Product Map

As discussed above, the interactive product map environment 114 provides a zoomable and pannable interactive substrate that displays a hierarchy of products available in a store (or from a group of stores). The interactive product map environment 114 includes a zoomable/pannable and reconfigurable product map substrate that is used for searching products. In one embodiment an "at a glance" view of several products is displayed for a given category. For example, instead of having to go to Maytag, Kenmore, Bosch, Viking, Miele store fronts, the user is able to view all these products on one interactive canvas (i.e., the interactive environment 114). Zooming in on the environment 114 triggers relevant products to come into view. Zooming out give a "birds-eye" view of the product landscape without overwhelming the consumer with mundane details. Panning left, right, up, down causes additional information to be displayed in the environment 114 based on the current zoom level.

Figure 2:
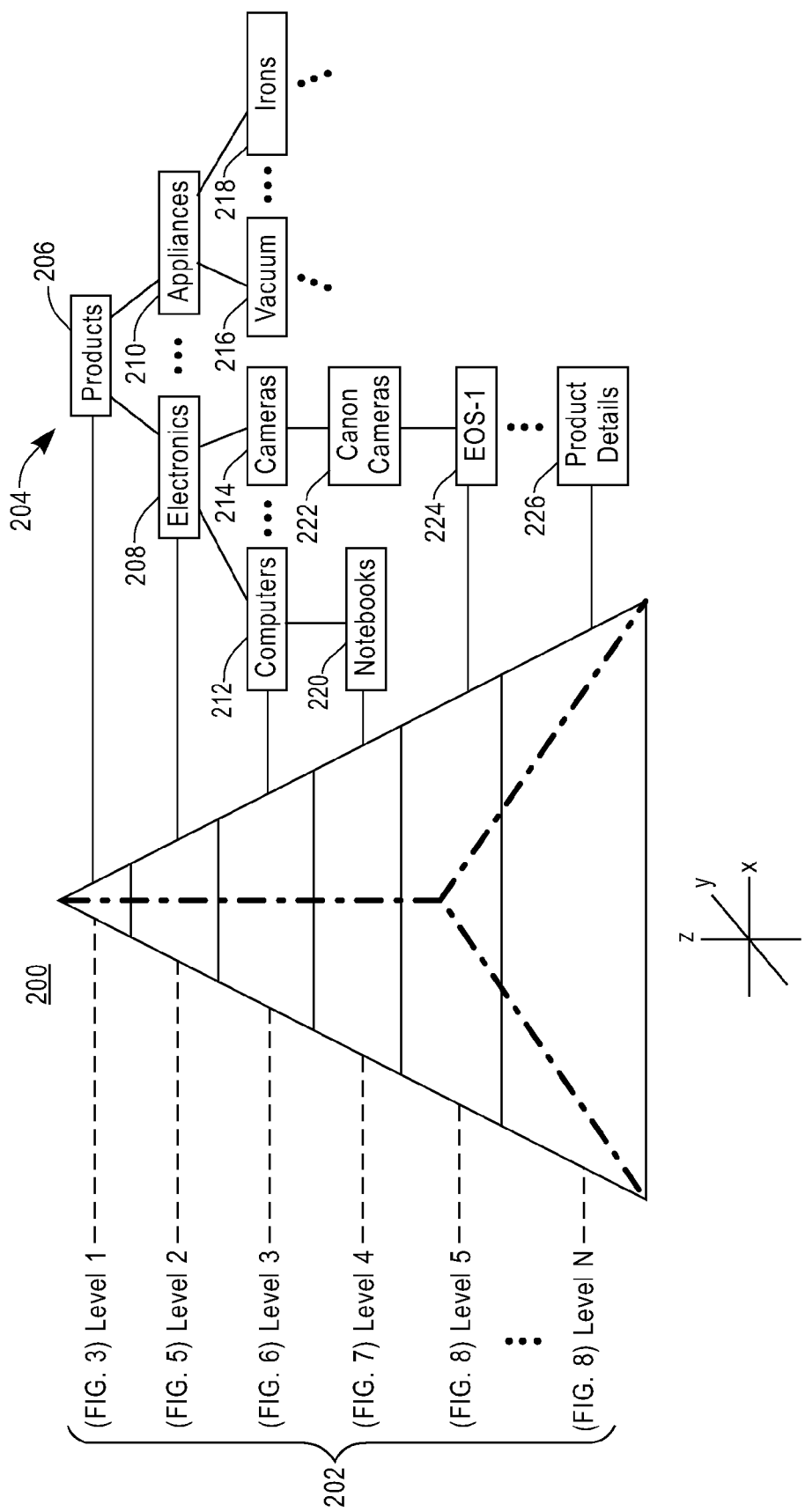
FIG. 2 is a hybrid diagram illustrating hierarchical and layer based structure of an interactive environment according one embodiment of the present invention.

FIG. 2 is a hybrid diagram illustrating hierarchical and layer based structure of the interactive environment 114. In particular, FIG. 2 shows a pyramid structure 200 comprising a plurality 202 of hierarchical layers in the z direction. These layers 202 correspond to a zoomable level of the interactive product environment 114. FIG. 2 also shows a hierarchical tree 204 corresponding to the layers 202 of the interactive product environment 114. The hierarchical tree 204 is used to provide a better understanding of the present invention. For example, the tree 204 shows the hierarchical relationships between the information provided to a user throughout the various levels. In particular, the tree 204 shows a root node 206 for Products. A first level displays product categories such as Electronics are displayed as shown by nodes 208 and 210.

Zooming into a second level displays products types such Cameras as shown by nodes 212, 214, 216, and 218. Zooming into a third level displays even further product types such Camera Digital SLR as shown by nodes 220 and 222. Zooming into a fourth level displays products under the Camera Digital SLR type such as Nikon D300 as shown by node 224. Further zoom levels can display even more detailed information such as product specifications as shown by node 226. It should be noted that as a user performs a zoom operation, each of the node levels of the hierarchical tree 204 are populated with the corresponding product information 124. For example, when a user zooms into level 2 displaying product types, product information 124 corresponding to the product types is retrieved and displayed to the user.

Figure 3:

FIG. 3 shows an example of the highest level (e.g., a fully zoomed-out view) of the interactive product environment 114. In particular, FIG. 3 shows the interactive product environment 114 configured for a particular store. In the example of FIG. 3, the user interaction manager 116 has determined that a user has set the zoom level to a full zoom-out level, e.g., level 1 as shown in FIG. 2. Alternatively, the full zoom-out level can be the default zoom level when a user visits the interactive product environment 114. A user is able to zoom into/out of the environment 114 using multiple actions. For example, the zoom module 120 can display, for example, one or more buttons that the user can click and/or drag to zoom in and out of the interactive product environment 114. Also, a user can zoom in/out using a mouse, stylus, and/or one or more keys on a keyboard. Zooming/panning can also be performed by using one or more fingers on the display of the device or on the device itself. For example, a pinching motion, twisting motion, swiping motion, and/or the like can be performed with one or more fingers on the display of the device such as on an iPhone or a stylus as used on a Treo or the frame of the device a user is interacting with. Also, if a user is interacting with a foldable and/or flexible display, folding and/or flexing of the display can cause a zooming and/or panning action to be performed. To ensure fast display times mechanisms such as caching and pre-rendering can be used so that the zooming/panning processes are seamless to the user.

The information manager 116 displays information in the environment 114 based on the current zoom level and/or panning position. For example, as shown in FIG. 3, a user is zoomed into level 1 of the environment 114. Therefore, the information manager 116 selects product information 124 from the product database 104 associated with level 1. In this example, the selected information 124 is product categories. In this example, the product information manager 116 also displays a subsequent or "deeper" level 2 that includes a plurality of product types for a given product category. For example, under the Electronics and Computers category 308 a set of product categories 310 such as Cameras, Camcorders, and Navigation is shown.

Figure 4:
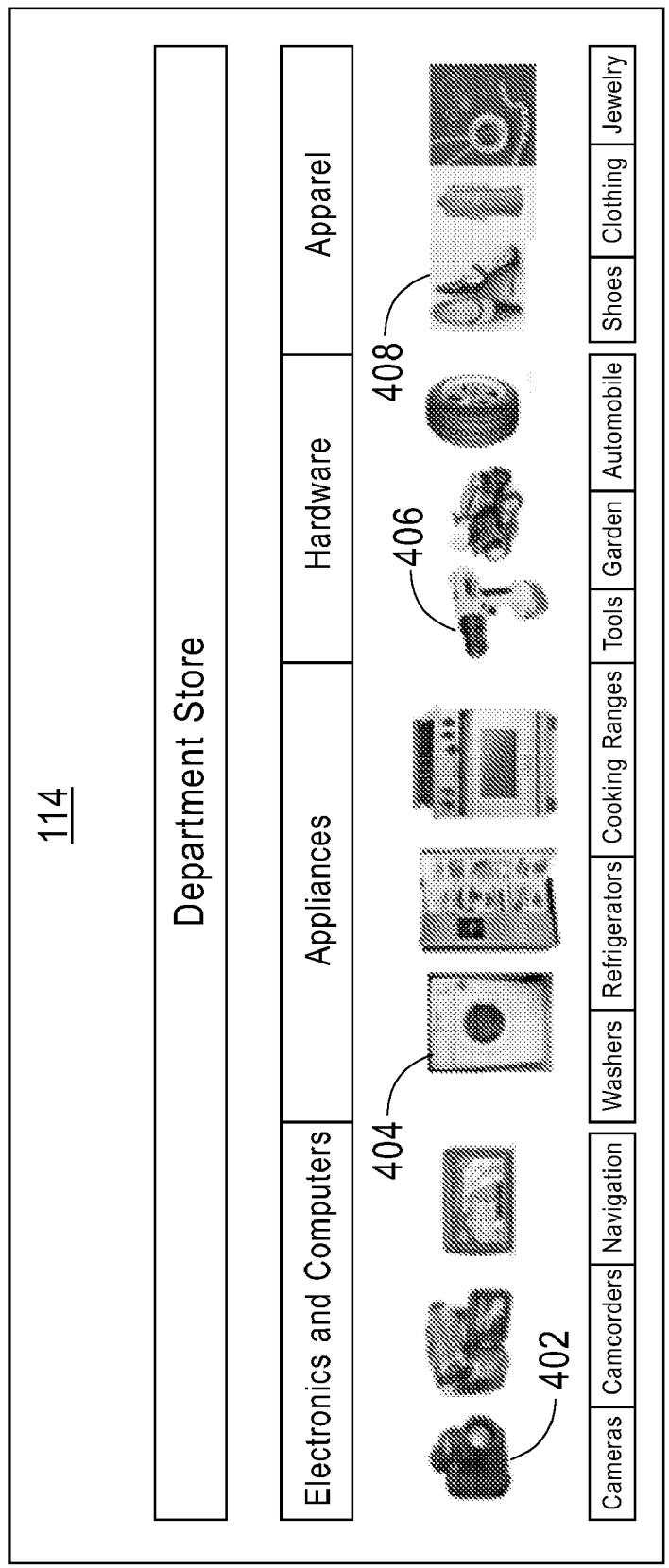

As discussed above, a user is also able to pan the environment 114 left, right, up, and/or down. For example, a user can pan the environment 114 to the left thereby removing at least a portion of the information displayed in FIG. 3 and causing new product categories and product types to be displayed. Additionally, the information manager 116 can also display icons and/or images 402, 404, 406, 408 for product categories as shown in FIG. 4. This improves visualization for the user. The information manager 116 can dynamically select which icons/images to display based on product cost, popularity, advertising incentives, user's geography, time of viewing, and the like. The icons/images can also be customized based on the user.

Figure 5:
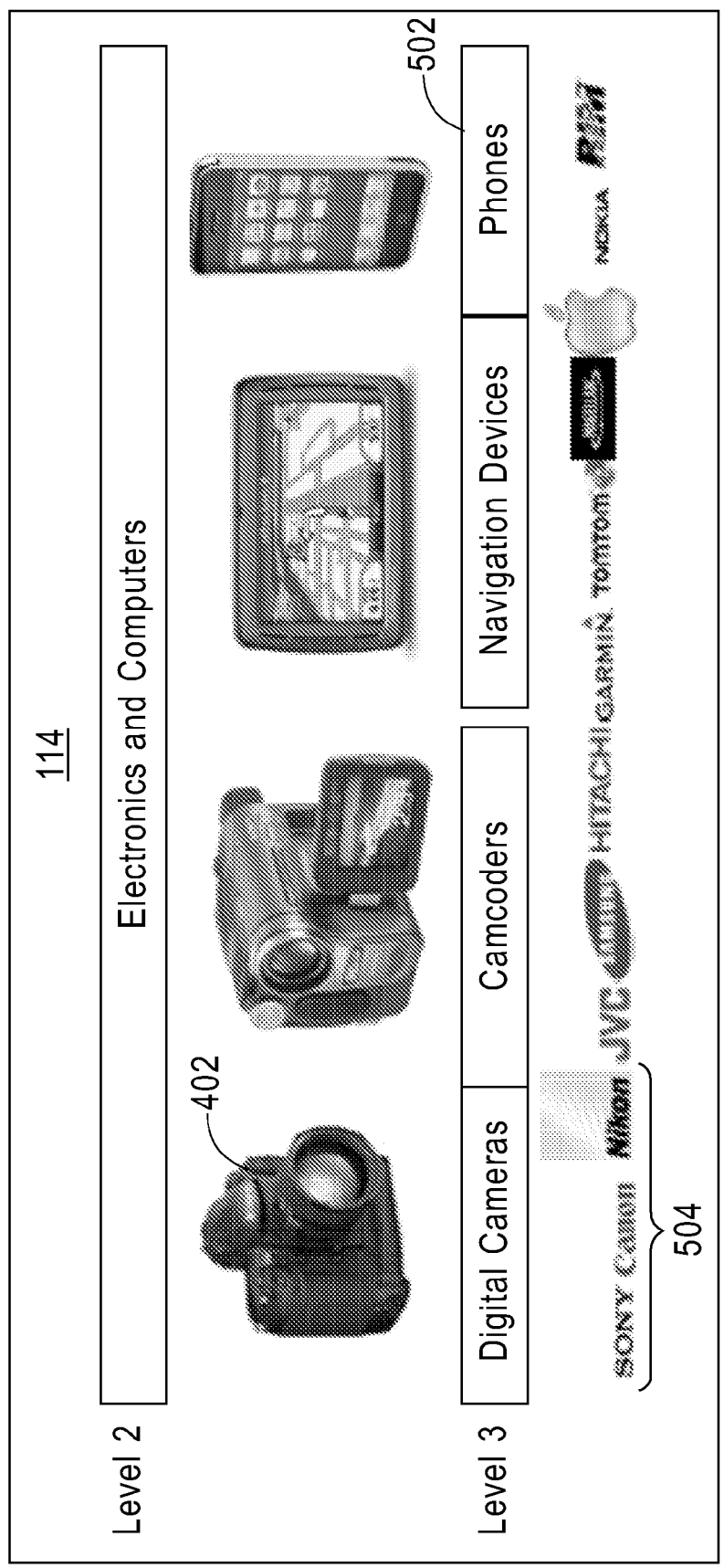

As the user zooms further into the environment 114 more detailed information is displayed to the user, as shown in FIG. 5. For example, in the example of FIG. 5, the user interaction manager 118 has determined that the user has zoomed into the Electronics And Computers category, which is level 2 of the hierarchical structure in this example. Accordingly, the information manager 116 retrieves more detailed information for this level and displays the more detailed information to the user. For example, additional product types such as "Phones" 502 are displayed to the user and available manufactures 504 for each product type. Also, any images that were previously displayed such as image 402 are now presented in a larger size to the user.

As can be seen from FIGS. 3 and 5, more product categories existed under the Electronics And Computers category than what is displayed in FIG. 5. This is because FIG. 5 displays a more "zoomed-in" view than FIG. 3. Therefore, a user can pan the environment 114 to the left and/or right (and/or up and down) to display the additional categories. Furthermore, with respect to the manufacturers displayed to a user, the information manager 116 may select only the most popular brand to display at a higher zoom level. As a user zooms into a lower level such as a product level, additional manufacturers can be displayed. However, other factors such as advertising incentives can cause the information manager 116 to select particular manufacturers to be displayed as well.

Figure 6:
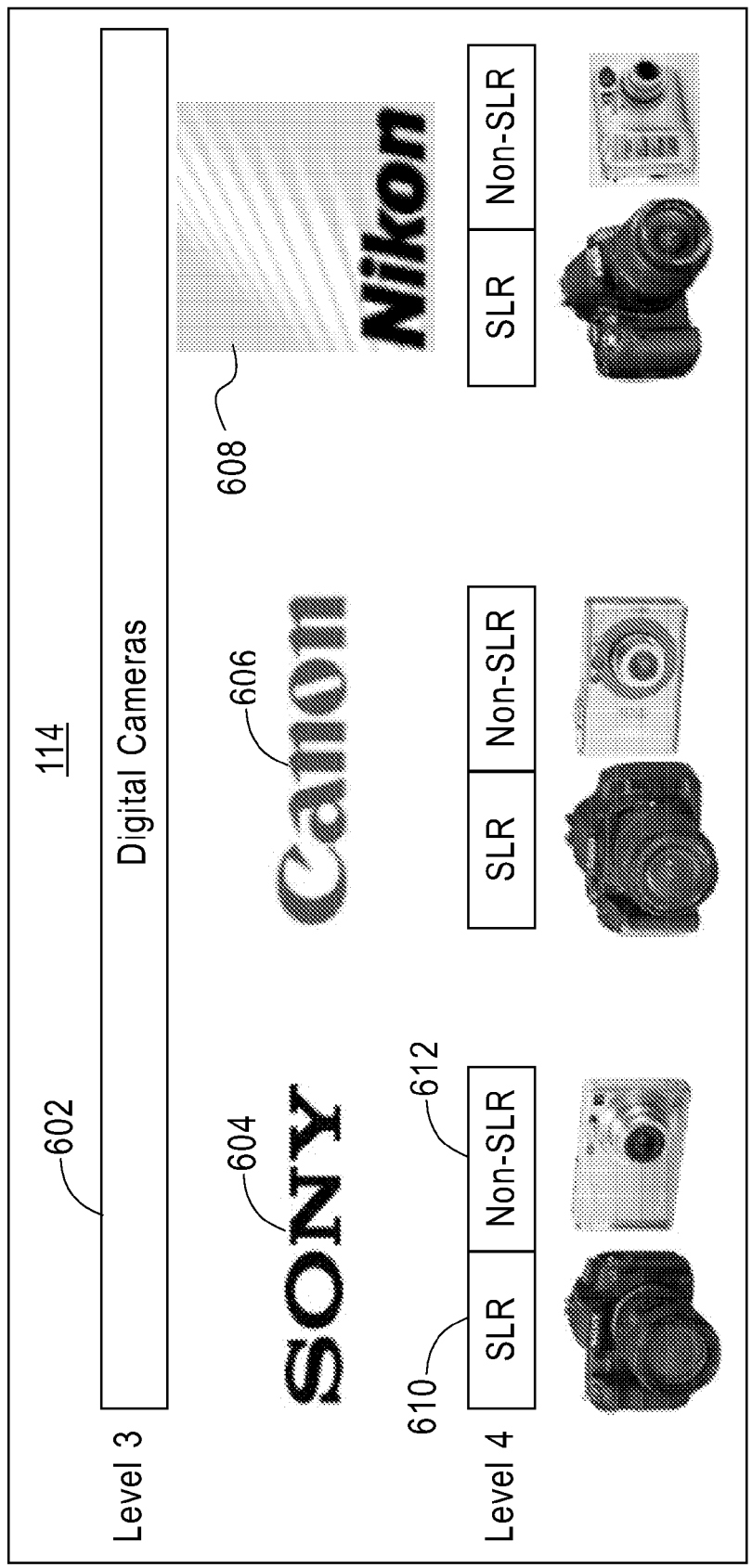

FIG. 6 shows an even deeper level that a user has zoomed into. In particular, the user has zoomed into a product type category Digital Cameras 602. In the current example, this is level 3 of the environment as shown in FIG. 2. The user interaction manager 118 determines that the user has zoomed into level 3 and relays this information to the information manager 116. The information manager 116 then retrieves the appropriate information 124 from the product information database 104 to be displayed to the user at this level. As can be seen from FIG. 6 more detailed product type information is shown such as "SLR" 410 and "Non-SLR" 612.

The information manager 116 displays a plurality of manufactures 604, 606, 608 and a more detailed product type associated with the "parent" product type. For example, as discussed above, the user zoomed into the Digital Camera category 602. Therefore, the information manager 116 displayed more detailed product types such as "SLR" 610 and "Non-SLR" 612 for the Digital Camera product type.

Figure 7:
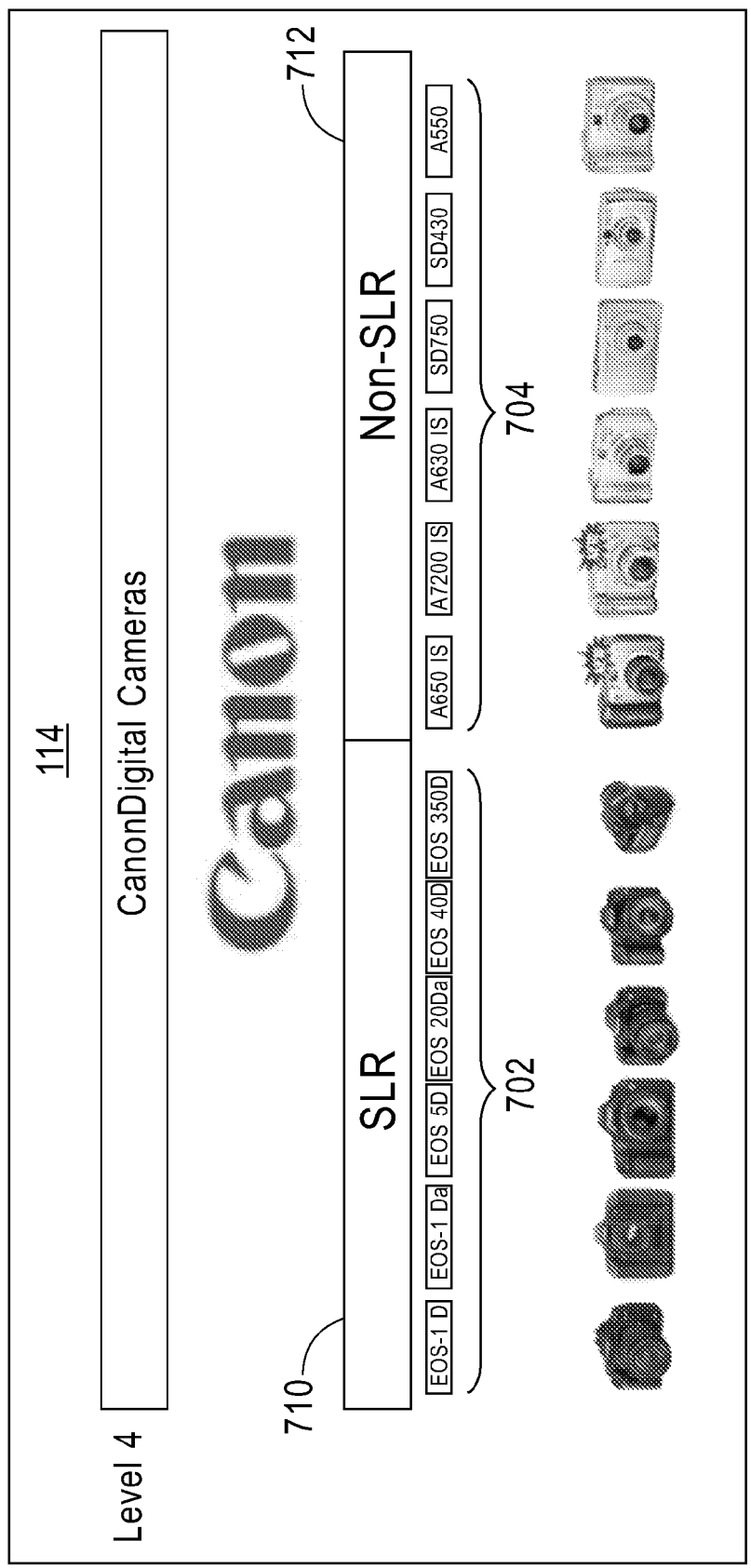

FIG. 7 shows that a user has zoomed into the Canon digital Camera displayed in level 3 (FIG. 5) of the environment 114. Therefore, the information manager 116 retrieves information for the Canon cameras level, which is level 4 of the environment as shown in FIG. 2. In this level, the information manager 116 has displayed a more detailed view of the "SLR" 710 and "Non-SLR" 712 product types comprising a plurality of specific cameras 702, 704 that are SLR and Non-SLR respectively. The specific products (cameras on this example) 702, 704 can be selected by the information manager 116 based on a variety of factors such as (but not limited to) popularity, advertising incentives, user preferences, previous purchases of the user, rating, review, and the like.

Also, as discussed above, the user can pan the environment 114 to display additional products (cameras in this example). However, if more than one product type such as SLR 710 and Non-SLR 712 are displayed such as shown in FIG. 7, a user can pan within that particular product type. For example, a user can pan within the SLR product type 710 while the Non-SLR products 704 remain stationary. Also, a user can select a portion of the display to zoom into or out of. For example, a user can select an area by drawing a rectangle or any other type of boundary indicator on the display area. The user is then able to pan into and/or out of the portion of the display area that is within the boundary indicator created by the user. The remaining portion of the display area that is outside of the boundary indicator remains at the current zoom/pan level.

For example, if the current zoom level displays product categories such as "Electronics" 208 and "Appliances" 210, the user can select a portion of the display such as an area around and including the "Electronics" 208 text/widget. The user is then able to zoom/pan within the selected area. Therefore, the user can zoom into deeper levels within the selected area such as electronic product types such as computers and cameras or specific electronic products such as a specific digital camera. The area outside of the selected area remains at the current zoom level, which in this example is product categories.

Figure 8:

FIG. 8 shows that a user has zoomed into a further level of the environment 114. In particular, FIG. 8 shows that the user has zoomed into a particular product (a particular camera in this example) that was displayed in the previous level 4 as shown in FIG. 7. Therefore, the information manager 116 retrieves information 124 specific to the product associated with the zoomed in level. For example, product specifications, user manuals, how-to-guides and like can be displayed to the user.

Additionally, a user is able to change the current view of the interactive product environment 128. For example, assume that a current view displays a set of levels in a first order such as a first level comprising product categories and then a second level comprising stores that sell items under those categories. A user can submit a request to the interactive product environment 128 to change the current view of the interactive environment. The interactive environment 128 the dynamically adjusts, in response to receiving the request, the current view of the by associating the set of levels with a second order. For example, the interactive environment 128 can now first display the stores and then the product categories of items that each store sells. This new view is then displayed to the user in the interactive environment 128.

Figure 9:
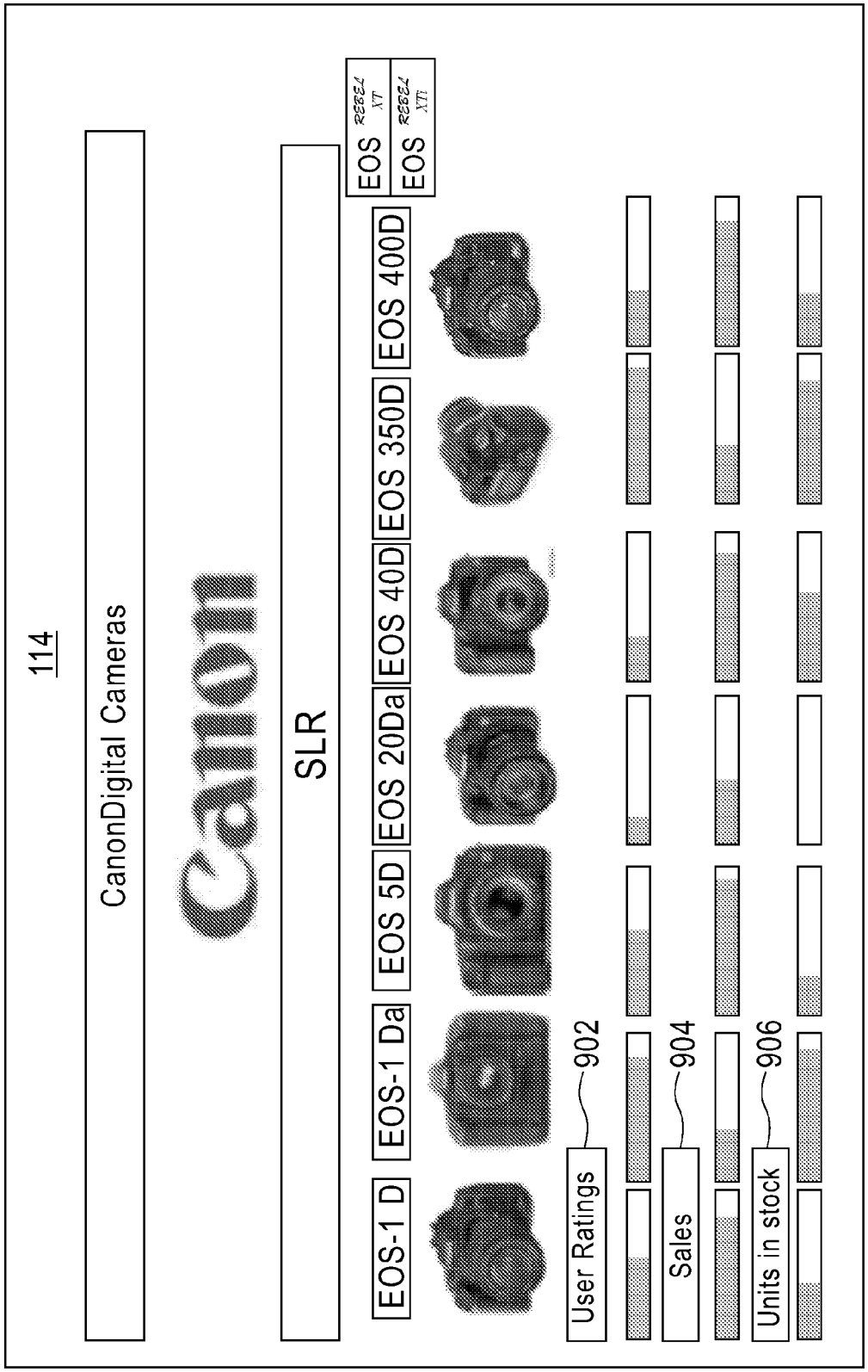

Furthermore, the interactive product environment 114 can be configured to allow a user to enter a review or rate the product directly on the environment as shown in FIG. 8. For example, FIG. 8 shows a review 806 entered by a user directly on the environment 114 without having to be directed to another webpage. Similarly user ratings 902, inventory information 904, sales information 906, and the like can be displayed for each product as shown in FIG. 9. Also, a user can select various products for comparison using the panning feature discussed above. For example, a user can select a first product and then pan left, right, up, and/or down to find another product to compare. The panning ability is advantageous because a user can identify products that are not currently being displayed.

As discussed above, the information manager 116 retrieves product information 124 from the product database 104 based on the current zoom level and/or pan position of the environment 114. In addition, a user can apply various filters that filter the information being displayed. For example, a user can apply a filter of Canon, Cost <$900 for SLR and Cost <$300 for non-SLR, and ratings 5 out of 5. Therefore, no matter what zoom level or pan position the user has selected, only cameras made by Canon that are either SLR and less than $900 or Non-SLR and less than $300 with a rating of 5 out of 5 will be displayed.

Figure 11:
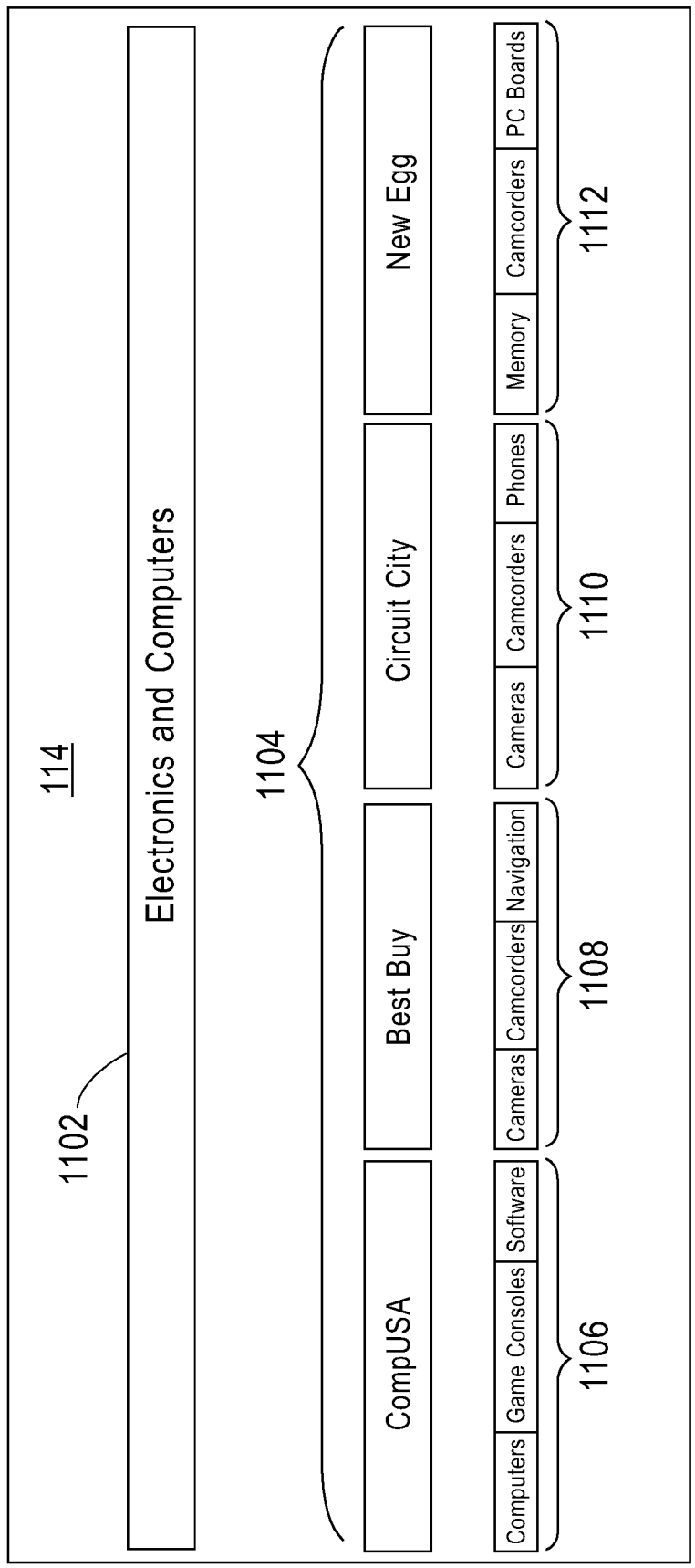

The interactive product environment 114 can also organize information on different axes than shown in FIGS. 3-9. For example, FIG. 10 shows the interactive product environment 114 with product categories 1002 as the highest level and stores 1004 providing those categories as the next lower level. This allows a user to search for products by store as compared to having to search a store. As a user zooms into a lower level (i.e., a more detailed level), as shown in FIG. 11, more detailed information is displayed about the stores. For example, FIG. 11 shows that the user has zoomed into the Electronics and Computers 1102 category. Therefore, a plurality of stores 1104 that have electronics and computers are displayed with a set of product types 1106, 1108, 1110, 1112 matching that category.

In another embodiment, the interactive environment 114 provide mashup capabilities comprising a plurality of mashable widgets 126 to offer the functionality discussed above. A mashup is a lightweight web application that is created by combining information or capabilities from more than one existing source to deliver new functions & insights. Mashups typically mash or remix information from multiple sources to create a new feed or a new application that presents information in a single graphical interface. Stated differently, a mashup is a type of situational application that is comprised of two or more disparate components that have been connected to create a new integrated experience. Mashups can be data level mashups or even visual mashups. Mashups can integrate content such static content, e.g., a Web page, with dynamic content, such as a SOAP or Representational State Transfer ("REST") service, or RSS feed.

Widgets 126 are software components that provide access (normally coarse grained) to one or more services or content/information. Stated differently, a widget is a small, portable application or piece of dynamic content that can easily be placed into a Web page or an embedded browser within a rich client. Widgets can be written in any language (JavaScript, Java, .NET, PHP, and more) or can be a simple HTML fragment. Widgets that pass events can be wired together to create mashups. Widgets are called different names by different vendors, for example gadgets, blocks, and flakes.

Widgets tend to be designed with a focus on consumption and customization to ensure they are extremely flexible, as one of the basic tenets of Web 2.0 is that you cannot anticipate how your content will be used. Widgets can be both visual (in that they render visual content, such as a chart) or non-visual (in that they provide some form of discrete function or access to a service). The interactive product environment 114 can be comprised of a plurality of widgets 126 for providing zooming/panning features, inventory information, sales information, user review/feedback features and information, and the like.

Figure 12:
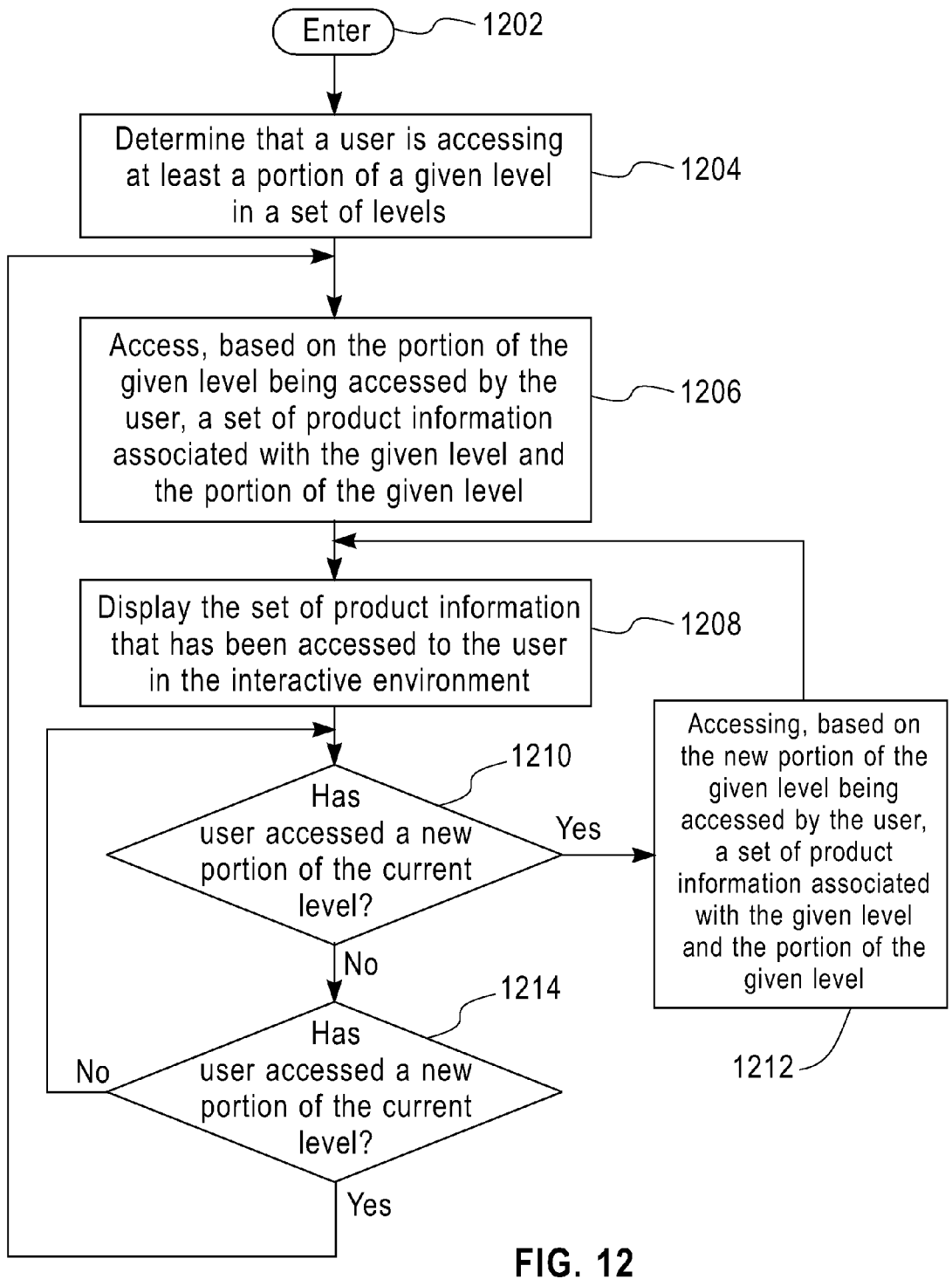
FIG. 12 is an operational flow diagram illustrating one example of presenting product information in an interactive environment according to one embodiment of the present invention.

Operational Flow Diagram for Presenting Product Information in an Interactive Environment FIG. 12 is an operational flow diagram illustrating a process of presenting product information in an interactive environment. The operational flow diagram of FIG. 12 begins at step 1202 and flows directly to step 1204. The user interaction manager 118, at step 1204, determines that a user is accessing at least a portion of a given level in the interactive environment 114. The information manager 116, at step 1206, accesses, based on the portion of the given level and the level itself being accessed by the user, a set of product information associated with the given level and portion of the level.

The information manger 116, at step 1208, displays the set of product information that has been accessed to the user in the interactive environment 114. The user interaction manager 118, at step 1210, determines if the user has accessed a new portion of the current level (e.g., user has performed a pan operation in the level). If the result of this determination is positive, the information manager 116, at step 1212 accesses, based on the new portion and the given level, a new set of product information. The control flow returns to step 1208 where the new information set displayed to the user in the interactive environment 114. If the result of this determination is negative, the user interaction manager 118, at step 1214, determines if the user has accessed a new given level (e.g., has performed a zoom operation).

If the result of this determination is negative, the user interaction manager 118 continues to monitor for a portion changed and/or a new level being accessed. If the result of this determination is positive, the control flows to step 1206 where the information manager 116 accesses a new set of data which is more detailed than the previous level based on the new level being accessed and the portion of the new level being accessed.

Computing System

Figure 13:
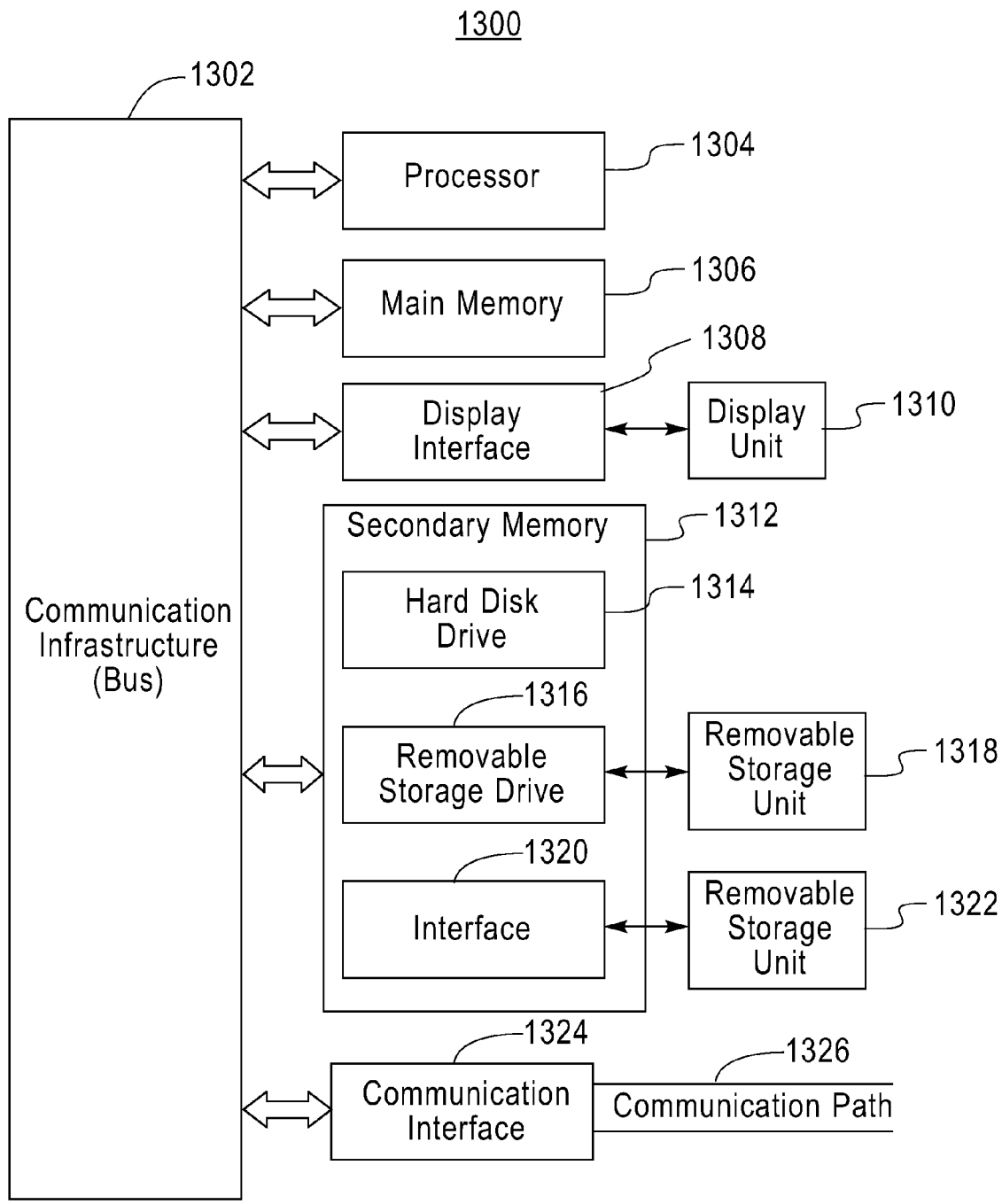
FIG. 13 is a block diagram illustrating a detailed view of an information processing system, according to one embodiment of the present invention.

FIG. 13 is a high level block diagram illustrating a more detailed view of a computing system 1300 such as the information processing system 102 useful for implementing interactive product mapping environment 114 according to embodiments of the present invention. The computing system 1300 is based upon a suitably configured processing system adapted to implement an exemplary embodiment of the present invention. For example, a personal computer, workstation, or the like, may be used.

In one embodiment of the present invention, the computing system 1300 includes one or more processors, such as processor 1304. The processor 1304 is connected to a communication infrastructure 1302 (e.g., a communications bus, crossover bar, or network). Various software embodiments are described in terms of this exemplary computer system. After reading this description, it becomes apparent to a person of ordinary skill in the relevant art(s) how to implement the invention using other computer systems and/or computer architectures.

The computing system 1300 can include a display interface 1308 that forwards graphics, text, and other data from the communication infrastructure 1302 (or from a frame buffer) for display on the display unit 1310. The computing system 1300 also includes a main memory 1306, preferably random access memory (RAM), and may also include a secondary memory 1312 as well as various caches and auxiliary memory as are normally found in computer systems. The secondary memory 1312 may include, for example, a hard disk drive 1314 and/or a removable storage drive 1316, representing a floppy disk drive, a magnetic tape drive, an optical disk drive, and the like. The removable storage drive 1316 reads from and/or writes to a removable storage unit 1318 in a manner well known to those having ordinary skill in the art.

Removable storage unit 1318, represents a floppy disk, a compact disc, magnetic tape, optical disk, etc. which is read by and written to by removable storage drive 1316. As are appreciated, the removable storage unit 1318 includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer-readable information.

In alternative embodiments, the secondary memory 1312 may include other similar means for allowing computer programs or other instructions to be loaded into the computing system 1300. Such means may include, for example, a removable storage unit 1322 and an interface 1320. Examples of such may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to the computing system 1300.

The computing system 200, in this example, includes a communications interface 1324 that acts as an input and output and allows software and data to be transferred between the computing system 1300 and external devices or access points via a communications path 1326. Examples of communications interface 1324 may include a modem, a network interface (such as an Ethernet card or Wireless networking cards), a communications port such as (but not limited to) Universal Serial Bus ports and Bluetooth®, a PCMCIA slot and card, etc. Software and data transferred via communications interface 1324 are in the form of signals which may be, for example, electronic, electromagnetic, optical, or other signals capable of being received by communications interface 1324. The signals are provided to communications interface 1324 via a communications path (i.e., channel) 1326. The channel 1326 carries signals and may be implemented using wire or cable, fiber optics, a phone line, a cellular phone link, an RF link, and/or other communications channels.

In this document, the terms "computer program medium," "computer usable medium," "computer readable medium", "computer readable storage product", and "computer program storage product" are used to generally refer to media such as main memory 1306 and secondary memory 1312, removable storage drive 1316, and a hard disk installed in hard disk drive 1314. The computer program products are means for providing software to the computer system. The computer readable medium allows the computer system to read data, instructions, messages or message packets, and other computer readable information from the computer readable medium.

Computer programs (also called computer control logic) are stored in main memory 1306 and/or secondary memory 1312. Computer programs may also be received via communications interface 1324. Such computer programs, when executed, enable the computer system to perform the features of the various embodiments of the present invention as discussed herein. In particular, the computer programs, when executed, enable the processor 1304 to perform the features of the computer system.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of presenting products in an interactive environment, the method comprising:
  executing with a processor of an information processing system the following:
  displaying, in the interactive environment, at least a first product category widget and a second product category widget associated with a given level in a set of levels of the interactive environment;
  determining that a user has created a boundary indicator surrounding a portion of the interactive environment comprising the first product category widget;
  determining that the user is performing at least a zoom operation on the interactive environment,
  wherein the zoom operation dynamically changes a product information detail level of the interactive environment to correspond to one level in the set of levels, and wherein each subsequent level in the set of levels is associated with a set of more detailed product information than a previous level in the set of levels;
  applying the zoom operation only to the portion of the interactive environment surrounded by the boundary indicator and comprising the first product category widget;
  maintaining, during the zoom operation, a remaining portion of the interactive environment including the second product category widget at the given level;
  identifying a level in the set of levels currently being accessed by the zoom operation;
  dynamically selecting, in response to the identifying, at least one of a product manufacturer and a product to be displayed at the identified level based on at least one dynamic attribute of the product manufacturer and the product, respectively,
  wherein the dynamic attribute of the product manufacturer comprises at least one of a popularity of the manufacturer and advertising incentives associated with the manufacturer,
  wherein the dynamic attribute of the product comprises at least one of a cost of the product and a popularity of the product; and
  displaying the at least one of the product manufacturer and the product that has been selected to the user in the portion of the interactive environment.

2. The method of claim 1, further comprising:
 determining that a user has performed a pan operation on the interactive environment, wherein the pan operation dynamically displays additional product information at a current detail level of the interactive environment.

3. The method of claim 1, wherein the interactive environment is a mashable substrate comprising a plurality of mashable widgets.

4. The method of claim 3, wherein the plurality of widgets includes at least one of:
 a product inventory widget; and
 a user feedback widget.

5. The method of claim 1, further comprising:
 determining that the user has performed another zoom operation to access at least a portion of another level in the set of levels;
 accessing, based on the portion of the level being accessed by the user, a more detailed set of information associated with the at least one of the product manufacturer and the product; and
 displaying the more detailed set of information that has been accessed to the user in the interactive environment.

6. The method of claim 5, wherein displaying the more detailed set of information that has been accessed to the user in the interactive environment further comprises:
 displaying the more detailed set of information within the at least one portion of the interactive environment where the zoom operation has been performed; and
 continuing to display a current set of information associated with a current level at remaining portions of the interactive environment.

7. The method of claim 5, wherein the set of information includes at least one of:
 product categories;
 product types;
 products;
 product inventory information;
 product sales information; and
 product specification information.

8. The method of claim 5, wherein the set of product information is provided by at least one of:
 manufacturers;
 stores;
 ratings organizations; and
 currency rate providers.

9. The method of claim 1, further comprising:
 determining that a user is accessing at least a portion of a given level in a set of levels of the interactive environment, wherein the determining comprises
 accessing historical data associated with the user, wherein the historical data comprises information associated with at least one of a previous zoom level and a previous pan position a user was viewing during at least one previous use of the interactive environment, wherein the portion of the given level corresponds to at least one of the previous zoom level and the previous pan position.

10. The method of claim 1, further comprising:
 determining that a user is accessing at least a portion of a given level in a set of levels of the interactive environment, wherein each subsequent level in the set of levels is associated with a set of more detailed product information than a previous level in the set of levels;
 accessing, based on the portion of the given level being accessed by the user, a set of product information associated with the given level and the portion of the given level; and
 displaying the set of product information that has been accessed to the user in the interactive environment.

11. The method according to claim 1, further comprising:
 receiving a request from the user to change a view of the interactive environment, wherein the view comprises the set of levels in a first order;
 dynamically adjusting, in response to receiving the request, the view of the interactive environment, wherein the dynamically adjusting comprises associating the set of levels with a second order; and
 displaying, in response to dynamically adjusting, the view, which has been dynamically adjusted, to the user.

12. The method of claim 11, wherein the dynamically adjusting comprises:
 rearranging an order of at least two levels within the set of levels.

13. An information processing system for presenting products in an interactive environment, the information processing system comprising:
 a memory;
 a processor communicatively coupled to the memory; and
 an interactive environment communicatively coupled to the memory and the processor, wherein the interactive environment is configured to perform a method comprising:
 displaying, in the interactive environment, at least a first product category widget and a second product category widget associated with a given level in a set of levels of the interactive environment;
 determining that a user has created a boundary indicator surrounding a portion of the interactive environment comprising the first product category widget;
 determining that the user is performing at least a zoom operation on the interactive environment,
 wherein the zoom operation dynamically changes a product information detail level of the interactive environment to correspond to one level in the set of levels, and wherein each subsequent level in the set of levels is associated with a set of more detailed product information than a previous level in the set of levels;
 applying the zoom operation only to the portion of the interactive environment surrounded by the boundary indicator and comprising the first product category widget;
 maintaining, during the zoom operation, a remaining portion of the interactive environment including the second product category widget at the given level;
 identifying a level in the set of levels currently being accessed by the zoom operation;
 dynamically selecting, in response to the identifying, at least one of a product manufacturer and a product to be displayed at the identified level based on at least one dynamic attribute of the product manufacturer and the product, respectively,
 wherein the dynamic attribute of the product manufacturer comprises at least one of a popularity of the manufacturer and advertising incentives associated with the manufacturer,
 wherein the dynamic attribute of the product comprises at least one of a cost of the product and a popularity of the product; and
 displaying the at least one of the product manufacturer and the product that has been selected to the user in the portion of the interactive environment.

14. The information processing system of claim 13, wherein the method further comprises:

determining that a user has performed a pan operation on the interactive environment, wherein the pan operation dynamically displays additional product information at a current detail level of the interactive environment.

15. The information processing system of claim 13, wherein the method further comprises:

determining that user has performed another zoom operation to access at least a portion of another level in the set of levels;

accessing, based on the portion of the level being accessed by the user, a more detailed set of information associated with the at least one of the product manufacturer and the product; and displaying the more detailed set of information that has been accessed to the user in the interactive environment.

16. A computer program storage product presenting products in an interactive environment, the computer program storage product comprising a non-transitory computer readable storage medium comprising instructions for:

displaying, in the interactive environment, at least a first product category widget and a second product category widget associated with a given level in a set of levels of the interactive environment;

determining that a user has created a boundary indicator surrounding a portion of the interactive environment comprising the first product category widget;

determining that the user is performing at least a zoom operation on the interactive environment, wherein the zoom operation dynamically changes a product information detail level of the interactive environment to correspond to one level in the set of levels, and wherein each subsequent level in the set of levels is associated with a set of more detailed product information than a previous level in the set of levels;

applying the zoom operation only to the portion of the interactive environment surrounded by the boundary indicator and comprising the first product category widget;

maintaining, during the zoom operation, a remaining portion of the interactive environment including the second product category widget at the given level;

identifying a level in the set of levels currently being accessed by the zoom operation;

dynamically selecting, in response to the identifying, at least one of a product manufacturer and a product to be displayed at the identified level based on at least one dynamic attribute of the product manufacturer and the product, respectively, wherein the dynamic attribute of the product manufacturer comprises at least one of a popularity of the manufacturer and advertising incentives associated with the manufacturer, wherein the dynamic attribute of the product comprises at least one of a cost of the product and a popularity of the product; and displaying the at least one of the product manufacturer and the product that has been selected to the user in the portion of the interactive environment.

17. The computer program storage product of claim 16, further comprising instructions for:

determining that a user has performed a pan operation on the interactive environment, wherein the pan operation dynamically displays additional product information at a current detail level of the interactive environment.

18. The computer program storage product of claim 16, further comprising instructions for:

determining that user has performed another zoom operation to access at least a portion of another level in the set of levels;

accessing, based on the portion of the level being accessed by the user, a more detailed set of information associated with the at least one of the product manufacturer and the product; and displaying the more detailed set of information that has been accessed to the user in the interactive environment.

* * * * *